United States Patent [19]
Tabler

[11] 3,973,669
[45] Aug. 10, 1976

[54] ENDLESS CABLE CONVEYOR WITH MOLDED LUGS
[75] Inventor: Charles P. Tabler, Hamilton, Ohio
[73] Assignee: Kornylak Corporation, Hamilton, Ohio
[22] Filed: Feb. 19, 1975
[21] Appl. No.: 551,140

[52] U.S. Cl. ............................ 198/130; 198/168; 198/204; 104/180
[51] Int. Cl.² ................................... B65G 17/12
[58] Field of Search ........... 198/130, 160, 168, 172, 198/173, 176, 189, 200, 204, 131, 171; 104/108, 109, 110, 180, 193, 216; 238/132, 133, 134; 74/231 C

[56] References Cited
UNITED STATES PATENTS

| | | | |
|---|---|---|---|
| 871,563 | 11/1907 | Berthier | 238/133 |
| 2,536,575 | 1/1951 | Seldin | 198/168 |
| 2,609,915 | 9/1952 | DeBurgh | 198/172 X |
| 2,855,155 | 10/1958 | Andrianne | 238/133 |
| 3,134,481 | 5/1964 | Maimin | 198/168 |
| 3,164,245 | 1/1965 | Juengel | 198/130 X |
| 3,247,952 | 4/1966 | Kozlosky | 198/173 |
| 3,338,375 | 8/1967 | Evans | 198/130 |
| 3,799,326 | 3/1974 | Kretschmar | 198/130 |
| 3,856,134 | 12/1974 | Krammer | 198/189 |
| R22,789 | 9/1946 | Brunner | 198/168 |

Primary Examiner—John J. Love
Assistant Examiner—Richard K. Thomson

[57] ABSTRACT

The endless single cable conveyor with lugs moving in a guide channel for engaging either an article to be conveyed or a carrier for the article has the lugs molded of a synthetic resin onto the cable in triangular shape and received within a complimentary shaped channel for both the conveying run and the returned run respectively. With such complementary triangular shapes for both the lug and its channel, the channel may be bent in any direction as desired for the conveyor without fear of the lug moving out of the channel, and if excessive wear occurs to the portion of the lug extending beyond the channel to engage the article, the lug may be removed from the channel, rotated 120°, and reinserted within the channel to present a new article engaging portion that is undamaged. The channels are constructed opposite each other with a box beam between them, and the entire channel and box beam assembly is constructed in one piece by extrusion. The cable with molded lugs will leave the channel to pass around drive sprockets and direction changing sprockets, and reenter the channel through a transition portion wherein the side walls of the channel are flared outwardly away from each other to receive and guide the lugs into the channel.

21 Claims, 9 Drawing Figures

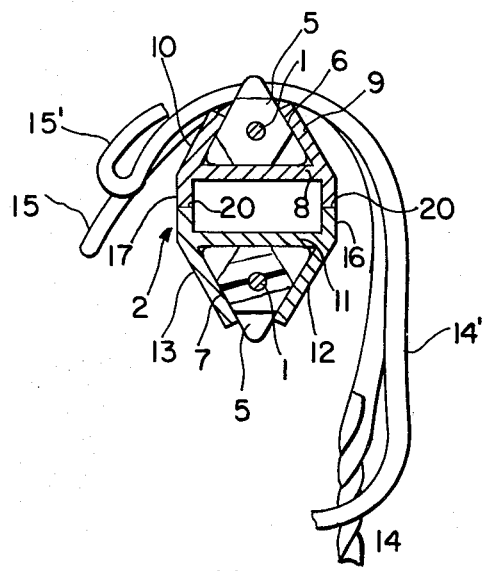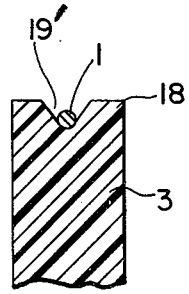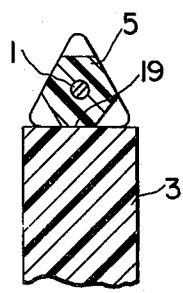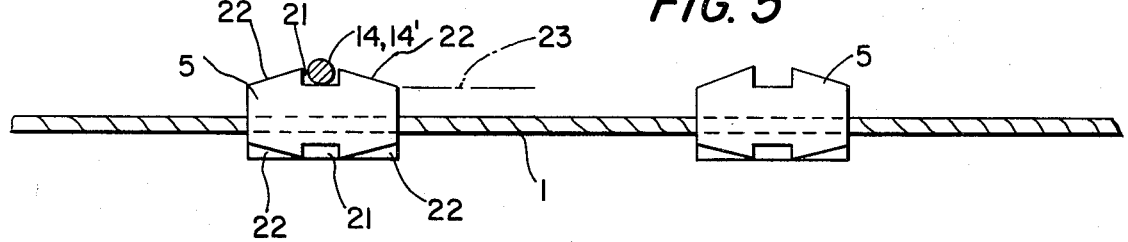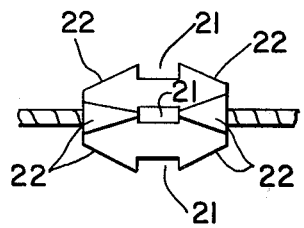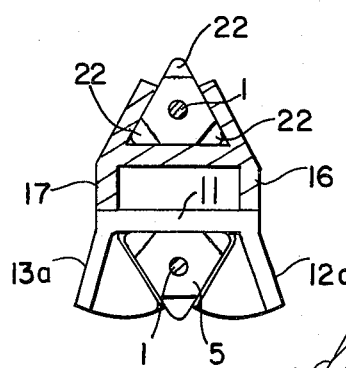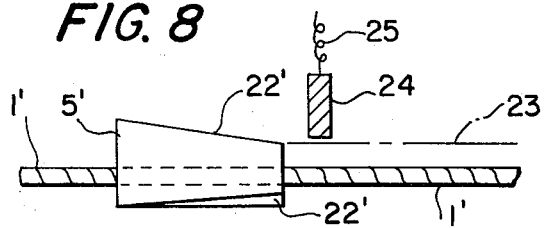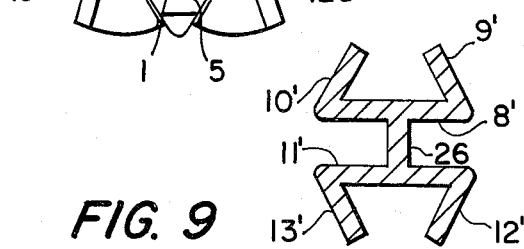

3,973,669

ENDLESS CABLE CONVEYOR WITH MOLDED LUGS

BACKGROUND OF THE INVENTION

An endless cable with balls mounted at spaced distances along the cable for engaging article carriers is shown in the patent to Maimin U.S. Pat. No. 3,134,481, May 26, 1964. Bachmann U.S. Pat. No. 3,422,950, Jan. 21, 1969, discloses an endless single cable conveyor with spaced nylon blocks driven by the teeth of a sprocket having the teeth slotted for reception of the cable therein. A further endless conveyor member with a track providing both the conveying run and the return run is shown in the Juengel U.S. Pat. No. 3,164,245.

While these prior art conveyors can be quite operative for their intended purpose, they all have one or more of the serious disadvantages of considerable cost due to fabrication of specialized parts and materials, the difficulty of reverse bends in the track causing either too much friction or escape of the endless conveyor member from the track, no way to automatically pick-up and securely hold articles or article carrier driving members that are placed upon the track, difficulty in replacing damaged parts, and generally inefficient operation.

SUMMARY

It is an object of the present invention to overcome the above disadvantages or at least minimize them with a single cable conveyor that may be used for conveying hooks for suspending articles, for driving lugs or the like on the bottom of article carrying pallets, for directly engaging articles, and for the like so as to present a versatile conveyor.

The endless single cable conveyor with lugs moving in a guide channel for engaging either an article to be conveyed or a carrier for the article has the lugs molded of a synthetic resin onto the cable in triangular shape and received within a complementary shaped channel for both the conveying run and the return run respectively. With such complementary triangular shapes for both the lug and its channel, the channel may be bent in any direction as desired for the conveyor without fear of the lug moving out of the channel, and if excessive wear occurs to the portion of the lug extending beyond the channel to engage the article, the lug may be removed from the channel, rotated 120°, and reinserted within the channel to present a new article engaging portion that is undamaged. The channels are constructed opposite each other with a box beam between them, and the entire channel and box beam assembly is constructed in one piece by extrusion. The cable with molded lugs will leave the channel to pass around drive sprockets and direction changing sprockets, and reenter the channel through a transition portion wherein the side walls of the channel are flared outwardly away from each other to receive and guide the lugs into the channel.

BRIEF DRESCRIPTION OF THE DRAWING

Further objects, features and advantages of the present invention will become more clear from the following detailed description of the drawing, wherein:

FIG. 2 is a cross sectional view taken along line II—II of FIG. 1;

FIG. 3 is a cross sectional view taken along line III—III of FIG. 1;

FIG. 4 is a cross section taken on line IV—IV of FIG. 1;

FIG. 5 is a side elevation view of a portion of the cable with its attached lugs, in detail;

FIG. 6 is a top view of one of the molded lugs on the cable of FIG. 5;

FIG. 7 is a cross section taken on line VII—VII of FIG. 1;

FIG. 8 is similar to FIG. 5 of a modification; and

FIG. 9 is similar to FIG. 2 of a modification.

DETAILED DESCRIPTION OF A PREFERRED EMBODIMENT

Figure 1:
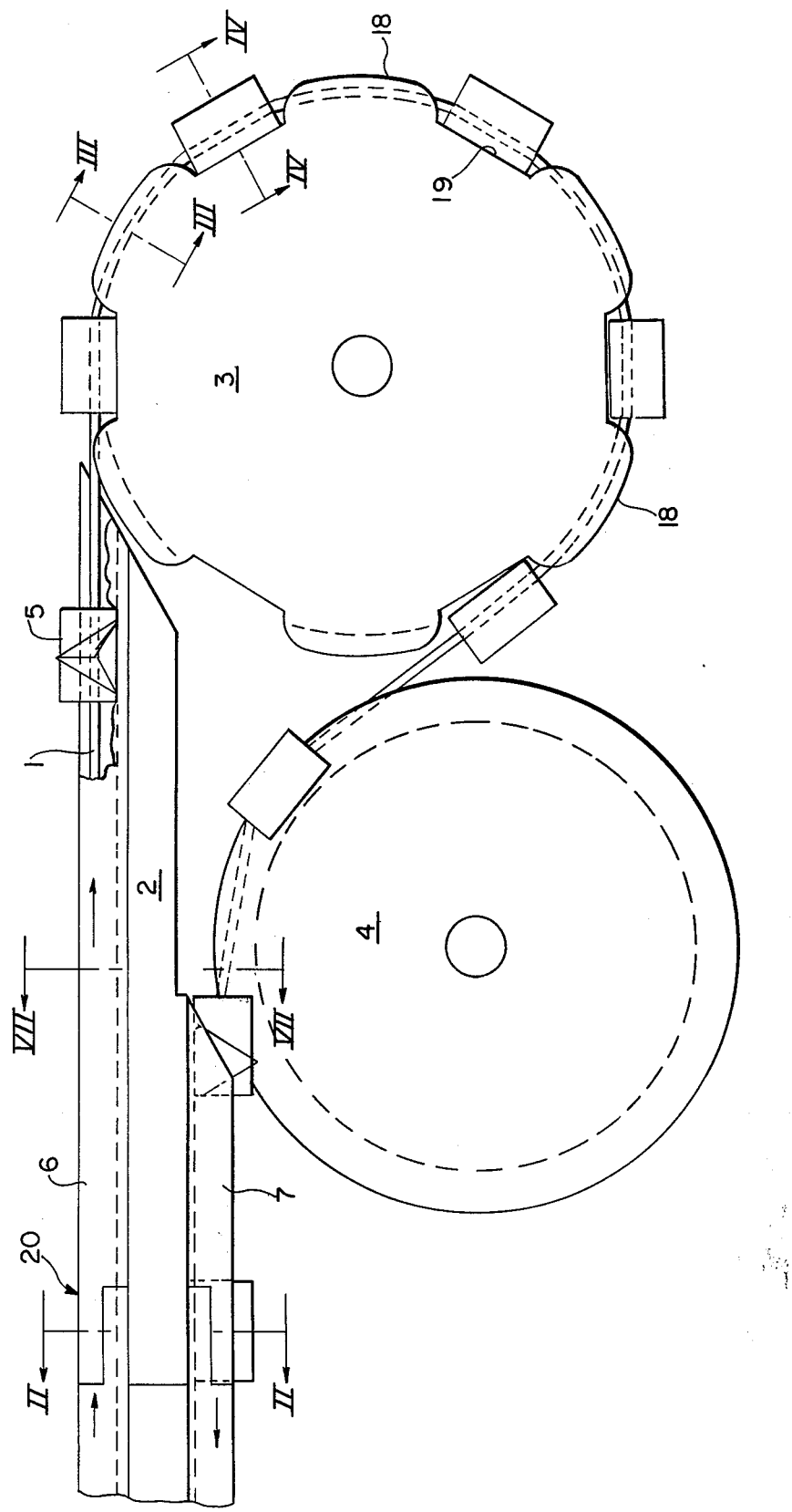
FIG. 1 is a side elevation view of one end of a conveyor employing the features of the present invention.

While the preferred embodiment of the present invention will be described specifically with respect to a conveyor set up for moving article carriers along a predetermined path wherein the article carriers have upper hooks being driven by the endless conveyor member and lower portions for suspending the articles, the present invention may also be used in a system wherein the bottoms of the articles are supported on one or more endless conveyor members or where the bottoms of pallets with or without driving lugs are supported on one or more endless conveying members, for example as shown in the Juengel U.S. Pat. No. 3,312,330 of Apr. 4, 1967. In such a system, the weight of either the pallet or article may be entirely supported by the endless conveying members or may be supported entirely or partially by roller ways and only driven by the lugs of the endless conveyor member.

In FIG. 1, there is shown the right hand portion of an endless single cable conveyor with driving lugs, which includes an endless cable 1 moving in a closed path as determined by a track 2 and sprockets 3, 4, as well as other similar tracks and sprockets not shown. At spaced intervals along the cable 1, there are secured lugs 5 for drivingly engaging either the articles to be conveyed or portions of carriers supporting the articles to be conveyed.

As shown in FIGS. 1 and 2, the track 2 has an upwardly opening portion 6 and a downwardly opening channel portion 7 for respectively receiving therein the conveying run of the endless conveyor member, which comprises the cable 1 and lugs 5, and the lower return run of the conveyor member. The upper conveying run channel 6 is defined by a lower wall or base 8, and opposed side walls 9, 10, which together form a partial equilateral triangle in cross section as shown in FIG. 2 in a plane perpendicular or transverse to the cable 1 received therein. The lower return run channel 7 is constructed in a similar manner with base 11 and side walls 12, 13. The channels 6 and 7 may be constructed identically as mirror images, or the side walls 12, 13 of the return run channel 7 may be constructed considerably longer than the conveying run channel or may in fact extend to an apex where they are integral with each other to provide for a closed equilateral triangular periphery return run channel. Conveyor member 1, 5 is manufactured in indefinite length, cut to size, fed axially into the channels and connected at its ends into the endless form.

In FIG. 2, two constructions of a hook are shown for use with a conveyor. In a conventional manner, the lower end of either the hook 14 or 14' may be constructed to suspend or otherwise support an article to be conveyed, and the terminal end of the hook 15 and 15', may be shaped in any manner without its design being dictated by the construction of the conveyor. The uppermost portion of each hook has its weight supported by the lug 5 and/or side walls 9, 10. As shown in FIG. 2, the uppermost portion of the lug 5 extends higher than the adjacent portion of the hook for engaging and driving the hook along the conveyor path.

In the cross sectional view of FIG. 2, it is seen that the lug 5 is generally in the shape of an equilateral triangle complementary to the equilateral triangular shape of each of the channels 6 and 7. Because the base portion of each of the lugs 5 that engages or is immediately adjacent to the respective base portion 8, 11 of each of the channels 6, 7 is of greater transverse width than the spacing between the free terminal edges of opposed side walls 9, 10 and 12, 13, respectively, it is seen that the lugs 5 and thus the cable 1 cannot be moved transversely out of the channels 6, 7. As a result of this construction, the channels may be bent in both horizontal and vertical curves, in any direction, without fear of the lugs escaping from their respective channels. Further, if the upper portions of the lugs 5 become damaged due to wear, abuse or accidents to the point where their conveying function is seriously compromised, the endless conveyor member 1, 5 may be removed endwise from the channels, at least the damaged lugs 5 may be rotated 120°, and the endless conveyor member may be reinserted within the channels so as to present new undamaged lug driving portions extending from the respected channels.

Preferably, the channels 6 and 7 are separated by a box beam defined by the spaced apart bases 11, 8 and box beam side walls 16, 17 to provide a very strong beam construction. For ease of manufacture and strength, the walls and bases 8, 9, 10, 11, 12, 13, 16, 17 may be constructed in one piece by extrusion in indefinite lengths and cut to desired lengths for assembly in the conveyor. Preferably, the material used will be a light weight aluminium preferably hard coated for wear. While extruded in metal indefinite lengths, such a material and construction may be readily bent along desired curves as mentioned above.

As shown in FIGS. 1, 3 and 4, the sprocket 3 may be molded from a synthetic resin for economy of construction and quietness of operation in a shape to have a plurality of evenly spaced teeth 18 around its periphery, which spacing will be the same as the spacing of the lugs 5 along the cable 1. The teeth 18 are spaced from each other a distance to received therebetween the lugs 5 for driving engagement. As seen from FIG. 4, the surface of the outer periphery of the sprocket 3 between adjacent teeth 18 is preferably flat and linear as shown at 19 to receive the similarly planar shaped base of the adjacent lug 5. As shown in FIG. 3, each of the teeth 18 is provided with a generally V-shaped slot 19' in its periphery for receiving therein the cable 1. The V-shaped slot 19' will center the cable 1 and thus the conveyor member on the periphery of the sprocket and retain it in that position.

The sprocket 4 is preferably an undriven V-shaped pulley of a synthetic resin and it is understood that preferably two sprockets identical to sprockets 3 and 4 are provided at the opposite end of the endless conveyor member. Since the sprocket 3 has more peripheral contact with the endless conveyor member than the sprocket 4, preferably at least one of the sprockets 3 will be driven to in turn drive the endless conveyor member through interengagement of the teeth 18 and lugs 5. Similarly, the remaining sprockets that are not driven by external sources will be driven by the endless conveyor member itself.

If it is necessary to splice the track 2, as at 20 in FIG. 1, a suitable interdigitating nonplanar cut between adjacent sections is preferred so as to accomplish vertical alignment of the channels 6 and 7 across the splice.

The lugs 5 are only schematically shown in FIG. 1, while their preferred constructions is shown in FIGS. 2, 4, 5, 6, 7. As an alternative construction for the lugs, such lugs may be of identical triangular shape throughout their length in the direction of the cable 1 for engaging the article or article carrier with their leading edge. Further, while hooks are shown for engaging the lugs 5 as in FIG. 2, it is also to be realized that the portion of the lug 5 extending upwardly beyond the channel 6 may engage an edge portion of an article resting upon the upper free edges of the walls 8, 10 or resting upon side roller ways as shown in one of the above mentioned Juengal patents. Further, article carriers may be provided with downwardly extending lugs for drivingly engaging the lugs 5. As a further use of the construction shown in FIG. 2, the portion of the lug 5 that extends downwardly beyond the free edges of the walls 12, 13 may be used to drive the upper edge of an article or article conveyor located beneath the channel 7; in such an event, the channel 7 would become the lower conveyor run channel while the channel 6 would become the upper return run conveyor channel and the channel 6 under such circumstances could well be of closed construction to prevent dirt from entering into the return run channel.

To continue with the preferred embodiment of the present invention, the specific shape of each of the lugs 5 is shown in FIGS. 5 and 6. Each lug 5 is constructed completely symmetrical with respect to a vertical plane passing through the geometric center of the lug 5 and perpendicular to the cable 1 as shown in FIGS. 6 and 5. As seen in cross section in FIG. 2 and in FIG. 4, each lug is of generally equilateral triangular shape, and each lug is effectively divided up into three identical portions spaced 120° from each other around the cable 1. Midway between the axial (as defined by the axis of the cable 1) ends of each lug 5, there is a through transverse channel or recess 21 in each of the three apexes; the upper one of these recesses 21, when traveling along the conveyor run as defined by channel 6, will drivingly receive therein the hook 14. The opposite axial end portions of each apex edge are beveled as at 22 to provide ramp or wedge surfaces. In FIG. 5, if the lugs 5 were traveling within the upper conveying run channel 6 of FIG. 1, the upper free edges of the side walls 9, 10 would generally be at a height as defined by reference line 23, so that if a hook 14 or 14', or a similarly shaped depending lug of an upper article carrying pallet, were placed so as to extend down to the reference line 23, it is seen that the ramp surface 22 would pick-up such hook portion or carrier lug and lift it upwardly to where it would drop into the recess 21. Within recess 21, the hook 14 or other engaging portion would be securely trapped. While it is seen that the ramp surfaces 22 are only needed at the leading edge of the lugs 5 for this described purpose, it is preferable to construct the lugs 5 symmetrical so that the cable 1 may be driven in either direction and still perform its function.

Preferably, each of the lugs 5 is constructed of a synthetic resin material to reduce friction within the channels 6 and 7, and such material is preferably nylon. The cable 1 may be specifically constructed as a link chain, a plurality of pivotally connected links, or single strand or double strand wire. In the preferred embodiment, the cable 1 is the commercially available aircraft cable constructed of stainless steel twisted multiple strand wire has sufficient stiffness to firmly resist relative rotation about the axis of the wire between the lugs 5. The lugs 5 are preferably molded directly on the cable 1 with no other securement to the cable 1, so that the cable 1 extends through the geometric center of each lug 5, with the lugs 5 spaced at uniform distances along the cable 1.

As shown in FIG. 1, after the endless conveying member travels around the end sprocket 3, it is returned to general alignment with the channel 7 by the sprocket 4. To accommodate some misalignment due to manufacturing tolerances and installation tolerances, between the endless conveyor member 1, 5 and the channel 7, a transition portion is provided at the end of the channel 7 adjacent the sprocket 4. The construction of this transition portion is shown in FIG. 7. In the transition portion, the side walls 12, 13 are bent and flaired outwardly from their position of FIG. 2 to the position of FIG. 7, so that the axial ends 12a and 13a closest to the sprocket 4 will be in a position such that they will increase in distance from each other as they extend from the base 11 to their free edges. The transition from the position 12a of FIG. 7 to the position 12 of FIG. 2 and the transition from the position 13a of FIG. 7 to the position 13 of FIG. 2 will be uniform and smooth so as to center and lift misaligned lugs 5 into the conforming channel 7.

The conveyor member of FIG. 8 is identical to the conveyor member of FIG. 5, except for the following differences. The lug 5' of FIG. 8 has the same axial end view as the lug 5 in the top of FIG. 2. The ramp surfaces 22' for the lug 5', extend continuously from the leading edge to the trailing edge for the full length of the lug 5', so that a hook portion (not shown in FIG. 8) resting upon the top of the edges of sides 9, 10 in FIG. 2 would be at the height of the line 23 in FIG. 8 so that the hooks would be pushed in the conveying direction by the ramp surface 22' due to friction. Whenever it is desired to collect the hooks, articles or the like, at a particular point along the conveyor path, a suitable blocking member schematically shown at 24 may be provided in the path of the hook. When the hook as driven by the ramp surface 22' strikes the blocking member 24, it will move up the ramp surface 22' and drop down the trailing edge of the lug 5' to remain at the collection station. Similarly, the hook will move over the ramp surface of each successive lug 5' so long as the block 24 is in place. The blocking member 24 may engage the top edges of the side walls 9, 10 and move upwardly against a spring 25 under the action of the ramp surface 22', or the blocking member 24 could be fixed so as to extend along one or more of the sides 9, 10 of FIG. 2 to engage and prevent movement of the hooks, without interferring with the path of travel of the lugs 5. With either construction for the blocking member 24, a suitable mechanism (not shown) would be provided to remove the blocking member from its operative position so that the hooks could move past the collection station unhindered.

The box beam construction of the channels has been illustrated and discussed with respect to FIG. 2; a modified form of the channel construction is shown in FIG. 9. The side walls 9', 10', 12' and 13' as well as the base walls 8', 11' may have the same construction and variations as the previously described side walls and base walls of FIG. 2. The only difference between the channels of FIG. 9 and FIG. 10 is that in FIG. 9 the walls 16, 17 of FIG. 2 have been removed and replaced by a central web wall 26, to provide I-beam construction for FIG. 9. All of the walls shown in FIG. 9 are preferably constructed in one piece by extrusion.

The operation of the conveyor has been set forth along with the description of its specific construction, so that further description of the operation is unnecessary.

While a preferred embodiment of the present invention has been set forth in detail for purposes of illustration and such details are important in their own right, further embodiments, modifications and variations, some of which have been discussed, are contemplated all according to the spirit and scope of the invention as defined by the following claims.

What is claimed is:

1. A conveyor, comprising: an endless conveyor member including an endless cable and a plurality of individual, separate lugs spaced along the length of said cable; track means for guiding said conveyor member in a predetermined conveyor path; drive means for moving said conveyor member in said predetermined path; said track means including outer opposite side walls extending inwardly towards each other with free edges generally parallel and spaced from each other; said track means receiving therein the adjacent ones of said lugs with said lugs each having a first drive portion extending outwardly beyond said free edges for driving adjacent articles to be conveyed and a guide portion extending inwardly on the opposite side of said free edges and having a transverse width substantially greater than the spacing between said free edges for preventing outward removal of said lugs from said track means; said lugs and track means being of such transverse cross sectional shape that when said drive portion becomes damaged, said lugs may be removed from said track means, rotated a predetermined angle about the axis of said cable, and reinserted in said track means to present a second article drive portion extending outwardly beyond said free edges and a second guide portion extending inwardly of said free edges, with said second drive portion including at least some of the first mentioned guide portion; and said track means and lugs having means normally preventing rotation of said lugs through said predetermined angle.

2. The conveyor of claim 1, wherein each of said drive portions, when in driving position, extends upwardly beyond said side walls and is provided with a transversely extending through recess for receiving therein a complementary shaped transversely extending article driving portion.

3. The conveyor of claim 2, wherein said lugs further have at least on their leading edge, with respect to the direction of conveying, an inclined ramp surface extending from the vicinity of the free edges of said side walls rearwardly to the height of at least the forward wall of said transversely extending through recess to provide means for engaging an article driving portion resting on said side walls and lifting said article driving portion upwardly to where it may drop into said through recess.

4. The conveyor of claim 3, wherein said lugs are constructed of a synthetic resin molded in one piece around said cable, with said cable extending through substantially the geometric center of each of said lugs.

5. The conveyor of claim 4, wherein said cable is constructed of a plurality of twisted indefinite length strands of metal wire.

6. The conveyor of claim 4, wherein said drive means includes a sprocket constructed of a synthetic resin and having around its periphery a plurality of radially extending teeth spaced from each other at substantially the same spacing as said lugs are spaced along said cable, and each of said teeth having a generally central slot for receiving therein said cable.

7. The conveyor of claim 1, wherein said track means is a channel that opens upwardly and said drive portions of said lugs extend beyond said channel in their driving position and are provided with an inclined ramp surface extending from the vicinity of their leading edge towards their trailing edge, from generally the height of said channel free edges at the leading edge rearwardly to the maximum height of said drive portions; and further including blocking means for preventing movement of articles to be conveyed past a collection station by applying a blocking force effectively to the articles sufficiently great to overcome the friction of the associated ramp surface.

8. The conveyor of claim 1, wherein each of said lugs has identical drive portions, and is further symmetrical with respect to a plane passing through said cable.

9. The conveyor of claim 1, wherein each of said lugs has three of said drive portions angularly spaced from each other around said cable with at least two of said drive portions being within said track means when any one of said drive portions is outside of said track means for driving an article.

10. The conveyor of claim 9, wherein each of said lugs is symmetrical about a plane passing through said cable and all of said drive portions of each lug are identical.

11. The conveyor of claim 1, wherein said track means and said lugs are provided with means, which includes said side walls and said drive and guide portions, for preventing transverse removal of said lugs from between said side walls in any transverse direction.

12. The conveyor of claim 1, wherein said track means is a channel member having a closed periphery, in transverse cross section, from one of said free edges to said other free edge for enclosing substantially all of said lugs except for one drive portion extending outside of said channel, and said channel having an identical transverse cross section substantially throughout its entire axial extent as measured in the direction of said cable.

13. The conveyor of claim 1, wherein said lugs are substantially identical, and wherein each of said lugs includes at least three substantially identical drive portions equally angularly spaced around said cable with said cable extending trhrough the geometric center of each of said lugs.

14. A conveyor, comprising: an endless conveyor member including an endless cable and a plurality of individual, separate lugs spaced along the length of said cable; track means for guiding said conveyor member in a predetermined conveyor path; drive means for moving said conveyor member in said predetermined path; each of said lugs having a generally polygonal cross sectional configuration transverse to said cable; said track means including an outwardly opening generally corresponding polygonal shaped, in transverse cross section, channel; said channel having outer opposite side walls extending inwardly towards each other with free edges spaced from each other; said channel being of complementary shape to and receiving therein the adjacent ones of said lugs with an apex portion of each lug extending outwardly from said outwardly opening channel beyond said free edges for driving adjacent articles to be conveyed; said lugs and channel generally having an equilateral triangular shape in transverse cross section with said channel having a base wall integral with said side walls and adjacent the base wall of said lugs opposite said apex portion; the transverse width of said lug base side being subtantially greater than the spacing between said channel side wall free edges, whereby if the apex portion of said lugs that extends beyond said channel for driving articles to be conveyed becomes damaged, said lugs may be removed from said channel, rotated 120° and reinserted in said channel to present a new article driving apex portion extending beyond said channel.

15. The conveyor of claim 14, wherein said track means includes a single piece extruded member having said outwardly opening triangular shaped channel along one side for receiving therein said endless cable member along the conveying run and at its opposite side having a similarly triangular shaped channel receiving therein said endless conveyor member along a return run of said endless conveyor member.

16. The conveyor of claim 15, wherein the bottom walls of said opposed channels are spaced from each other and connected at their outer edges by integral side walls to form a box beam between said channels.

17. The conveyor of claim 14, wherein said drive means includes at least one sprocket drivingly engaging said endless conveyor member around a portion of its periphery; said channel having an axial end immediately adjacent said sprocket for receiving therein said endless conveyor member as it is released from said sprocket; said channel including a guide transition portion at said terminal end defined by an outwardly opening channel having a bottom wall along its entire length and opposed transition said walls with each side wall having one edge secured to a respective side of said bottom wall and an opposite free edge, and said transition side walls being flaired away from said base wall at distances apart increasing from said base wall edges outwardly to said free edges at said one axial end and at the opposite axial end of said transition portion said side walls extending from said bottom wall inwardly towards each other at decreasing transverse distances apart to said free edges in the general triangular shape of said channel; and said transition portion side walls continuously and smoothly changing their shape from said one axial end to the opposite axial end to provide guide means for receiving the triangular shaped lugs of said endless conveyor member and moving them into a centered position adjacent said bottom wall for being received within the complementary shaped triangular channel.

18. The conveyor of claim 17, wherein said lugs are constructed of a synthetic resin molded in one piece around said cable, with said cable extending through substantially the geometric center of each of said lugs.

19. The conveyor of claim 17, wherein said track means includes a single piece extruded member having said outwardly opening triangular shaped channel along one side for receiving therein said endless cable member along the conveying run and at its opposite side having a similarly triangular shaped channel receiving therein said endless conveyor member along a return run of said endless conveyor member.

20. The conveyor of claim 19, wherein the bottom walls of said opposed channels are spaced from each other and connected at their outer edges by integral side walls to form a box beam between said channels.

21. The conveyor of claim 15, wherein the bottom walls of said opposed channels are parallel and spaced from each other and connected at their mid portions by an integral web wall to form an I-beam between said channels.

* * * * *